US008030439B2

(12) United States Patent
Wabnitz et al.

(10) Patent No.: US 8,030,439 B2
(45) Date of Patent: Oct. 4, 2011

(54) METHOD FOR THE PRODUCTION OF POLYTETRAHYDROFURANE OR TETRAHYDROFURANE COPOLYMERS

(75) Inventors: Tobias Wabnitz, Mannheim (DE); Stephan Hatscher, Syke (DE); Stefan Käshammer, Schifferstadt (DE); Rolf Pinkos, Bad Dürkheim (DE)

(73) Assignee: BASF SE, Ludwigshafen (DE)

( * ) Notice: Subject to any disclaimer, the term of this patent is extended or adjusted under 35 U.S.C. 154(b) by 337 days.

(21) Appl. No.: 12/303,491

(22) PCT Filed: May 25, 2007

(86) PCT No.: PCT/EP2007/055105
§ 371 (c)(1),
(2), (4) Date: Dec. 4, 2008

(87) PCT Pub. No.: WO2007/141148
PCT Pub. Date: Dec. 13, 2007

(65) Prior Publication Data
US 2009/0215971 A1 Aug. 27, 2009

(30) Foreign Application Priority Data
Jun. 9, 2006 (DE) .......... 10 2006 027 233

(51) Int. Cl.
*C08G 59/00* (2006.01)
(52) U.S. Cl. ........ 528/417; 520/113; 422/192; 422/218; 422/216; 422/179; 422/180; 422/141
(58) Field of Classification Search .......... 422/192, 422/218, 216, 179, 180, 141; 520/113; 528/417
See application file for complete search history.

(56) References Cited

U.S. PATENT DOCUMENTS

| 3,433,829 | A | 3/1969 | Dorfelt et al. |
| 4,120,903 | A | 10/1978 | Pruckmayr et al. |
| 4,189,566 | A | 2/1980 | Mueller et al. |
| 4,510,333 | A | 4/1985 | Pruckmayr |
| 5,208,385 | A | 5/1993 | Kahn et al. |
| 5,773,648 | A | 6/1998 | Becker et al. |
| 5,886,138 | A | 3/1999 | Muller et al. |
| 6,271,413 | B1 | 8/2001 | Muller et al. |
| 6,359,108 | B1 | 3/2002 | Eller et al. |
| 6,455,711 | B1 | 9/2002 | Eller et al. |
| 7,276,573 | B2 | 10/2007 | Pinkos et al. |
| 2004/0151640 | A1 | 8/2004 | Benfer et al. |

FOREIGN PATENT DOCUMENTS

| DE | 1226560 | 10/1966 |
| DE | 2916653 | 11/1980 |
| DE | 4205984 | 5/1993 |
| DE | 4316137 | 11/1994 |
| DE | 4316138 | 11/1994 |
| DE | 4433606 | 3/1996 |
| DE | 19513493 | 3/1996 |
| DE | 19742342 | 4/1999 |
| DE | 10120801 | 11/2002 |
| EP | 051499 | 5/1982 |
| JP | 04306228 | 10/1992 |
| JP | 07278246 | 10/1995 |
| JP | 10025340 | 1/1998 |
| WO | WO-9405719 | 3/1994 |
| WO | WO-9623833 | 8/1996 |
| WO | WO-9851729 | 11/1998 |
| WO | WO-9912992 | 3/1999 |
| WO | WO-2004031260 | 4/2004 |

OTHER PUBLICATIONS

International Preliminary Report on Patentability (Chapter II) for International Application No. PCT/EP2007/055105 dated Dec. 24, 2008 (5 pages).

*Primary Examiner* — Randy Gulakowski
*Assistant Examiner* — Shane Fang
(74) *Attorney, Agent, or Firm* — Connolly Bove Lodge & Hutz LLP

(57) ABSTRACT

The present invention relates to a process for preparing polytetrahydrofuran or tetrahydrofuran copolymers by polymerization of tetrahydrofuran in the presence of a telogen and/or a comonomer over a fixed bed of an acid catalyst, in which the temperature of the polymerization mixture increases in the direction of flow through the catalyst bed.

15 Claims, No Drawings

METHOD FOR THE PRODUCTION OF POLYTETRAHYDROFURANE OR TETRAHYDROFURANE COPOLYMERS

CROSS REFERENCE TO RELATED APPLICATIONS

This application is a National Stage of PCT/EP2007/055105 filed May 25, 2007 which in turn claims priority from German Application 102006027233.1 filed Jun. 9, 2006, the entire contents of which are incorporated herein by reference.

The present invention relates to a process for preparing polytetrahydrofuran or tetrahydrofuran copolymers by polymerization of tetrahydrofuran in the presence of a telogen and/or a comonomer over a fixed bed of an acid catalyst, wherein the temperature of the polymerization mixture increases in the direction of flow through the catalyst bed.

Polytetrahydrofuran (hereinafter also referred to as "PTHF"), also known as polyoxybutylene glycol, is a versatile intermediate in the plastics and synthetic fibers industry and is used, inter alia, as diol component for preparing polyurethane, polyester and polyamide elastomers. In addition, it, like some of its derivatives, is a valuable auxiliary in many areas, e.g. as dispersant or in the deinking of waste paper.

PTHF is usually prepared industrially by polymerization of tetrahydrofuran (hereinafter referred to as "THF") over suitable catalysts in the presence of reagents whose addition makes it possible to control the chain length of the polymer chains and thus to set the mean molecular weight (chain termination reagents or "telogens"). This control is achieved by choice of type and amount of the telogen. Additional functional groups can be introduced at one or both ends of the polymer chain by choice of suitable telogens.

Thus, for example, use of carboxylic acids or carboxylic anhydrides as telogens makes it possible to produce the monoesters or diesters of PTHF. PTHF itself is formed only after subsequent hydrolysis or transesterification. This preparation is therefore referred to as the two-stage PTHF process. PTHF can also be obtained in a single stage by polymerization of THF over acid catalysts using water, 1,4-butanediol or low molecular weight PTHF as telogen.

Other telogens act not only as chain termination reagents but are also incorporated into the growing polymer chain of PTHF. They not only have the function of a telogen, but at the same time act as a comonomer and can therefore equally well be designated as telogens and as comonomers. Examples of such comonomers are telogens having two hydroxy groups, e.g. dialcohols. These can be, for example, ethylene glycol, propylene glycol, butylene glycol, 1,3-propanediol, 1,4-butanediol, 2-butyne-1,4-diol, 2,2-dimethyl-1,3-propanediol, 1,6-hexanediol or low molecular weight PTHF.

Further suitable comonomers are cyclic ethers, preferably three-, four- and five-membered rings, for example 1,2-alkylene oxides, e.g. ethylene oxide or propylene oxide, oxetane, substituted oxetanes such as 3,3-dimethyloxetane and also THF derivatives such as 3-methyltetrahydrofuran, 3,3-dimethyltetrahydrofuran or 3,4-dimethyltetrahydrofuran.

With the exception of water, 1,4-butanediol and low molecular weight PTHF, the use of such comonomers or telogens leads to the preparation of tetrahydrofuran copolymers, hereinafter referred to as THF copolymers, and in this way makes it possible to modify PTHF chemically.

In industry, use is made predominantly of the abovementioned two-stage processes in which THF is, for example, polymerized in the presence of generally heterogeneous, i.e. largely undissolved, catalysts to form, firstly, polytetrahydrofuran esters which are subsequently hydrolyzed to PTHF. This form of the THF polymerization usually treats higher THF conversions than do single-stage processes.

Apart from the catalytic efficiency of the heterogeneous catalysts, both other reaction parameters and also their interaction with the catalyst selected exerts a critical influence on the result of the polymerization, in particular on conversion, yield and product properties such as color number and the molecular weight distribution of the polytetrahydrofuran or the tetrahydrofuran copolymers.

To set a narrow molecular weight distribution of the polymer in a targeted manner, it is critical, according to JP B 10-025340, to keep the reaction temperature constant during the entire polymerization reaction over heteropolyacids.

In contrast, U.S. Pat. No. 4,510,333 and DE-A 42 05 984 teach that in order to avoid color number problems and to set a narrow molecular weight distribution both over homogeneous catalysts, i.e. catalysts which are largely soluble in the reaction mixture, such as fluorosulfonic acid and also over heterogeneous catalysts such as bleaching earths it is advantageous for the reaction temperature to be reduced quickly during the course of the polymerization.

EP-A 0 051 499 discloses carrying out the polymerization of PTHF in a homogeneous process over fluorosulfonic acid or fuming sulfonic acid as catalyst and dividing the process into two steps. A first step takes place at temperatures in the range from −30° C. to +10° C., and the second step takes place in a second stirred vessel at temperatures which are from 10 to 40° C. above those mentioned above. In this way, an increase in the conversion is achieved at a high product purity. A disadvantage is that industrial implementation of the process described makes two stirred reactors, a high outlay for implementation and, as is usual in polymerizations over homogeneous catalysts, a complicated separation necessary.

Starting out from this prior art, it was an object of the invention to provide a process by means of which polytetrahydrofuran and/or tetrahydrofuran copolymers having a narrow mean molecular weight distribution can be prepared economically, with a good conversion and a low color number.

We have now found a process for preparing polytetrahydrofuran or tetrahydrofuran copolymers by polymerization of tetrahydrofuran in the presence of a telogen and/or a comonomer over a fixed bed of an acid catalyst, wherein the temperature of the polymerization mixture increases in the direction of flow through the catalyst bed.

The fixed catalyst bed can be located in one or more, interconnected fixed-bed reactors known per se, e.g. tube reactors. The polymerization is preferably carried out in one fixed-bed reactor.

The polymerization is generally carried out at temperatures of from 0 to 80° C., preferably from 25° C. to the boiling point of THF. For the purposes of the present invention, the reaction temperature is the respective temperature of the polymerization mixture. The temperature of the polymerization mixture (reaction temperature) at the beginning of the catalyst bed is from 0 to 50° C., preferably from 25 to 45° C. At the end of the fixed bed, the temperature is, according to the invention, from 30 to 80° C., preferably from 35 to 55° C.

The temperature increase according to the invention is at least 0.1° C. per meter of catalyst bed, preferably 0.2° C. per meter of catalyst bed and particularly preferably at least 0.3° C. per meter of catalyst bed, with the temperature increase being able to be continual or in at least two steps, preferably in two, three, four or five steps. The temperature increase preferably takes place in steps with a temperature difference of 1° C., preferably 2.5° C. The temperature increase should not exceed 5° C. per meter of catalyst bed.

The temperature increase in the reactor can be brought about by use of heating or cooling devices which are known per se and are customary in industry together with an appropriate measurement device for the local temperature of the polymerization mixture, for example thermocouples. Heating can also be effected using process heaters.

The pressure applied is generally not critical for the result of the polymerization, which is why the polymerization is generally carried out at atmospheric pressure or under the autogenous pressure of the polymerization system. Exceptions are copolymerizations of THF with the volatile 1,2-alkylene oxides, which are advantageously carried out under superatmospheric pressure. The pressure is usually from 0.1 to 20 bar, preferably from 0.5 to 2 bar.

The process of the invention makes it possible to obtain PTHF and THF copolymers having a narrow molecular weight distribution with a higher conversion of the telogen at constant product quality. Improved utilization of the telogen and/or comonomer contributes to economical utilization of raw materials and leads to an economical process.

In the process of the invention for preparing PTHF and THF copolymers, a monoester and/or diester of PTHF or of the THF copolymer is prepared in a first step by polymerization of THF, preferably in the presence of acetic anhydride and, if appropriate, comonomers over acid, preferably heterogeneous catalysts.

Suitable catalysts are, for example, catalysts based on the bleaching earths as are described, for example, in DE-A 1 226 560. Bleaching earths, in particular activated montmorillonites, can be used as shaped bodies in a fixed bed or in suspension.

Furthermore, catalysts based on mixed metal oxides, in particular of groups 3, 4, 13 and 14 of the Periodic Table of the Elements, are known for the polymerization of THF. Thus, JP-A 04-306 228 describes the polymerization of THF in the presence of a carboxylic anhydride over a mixed metal oxide comprising metal oxides of the formula $M_xO_y$ with integral values of x and y in the range 1-3. Examples mentioned are $Al_2O_3$—$SiO_2$, $SiO_2$—$TiO_2$, $SiO_2$—$ZrO_2$ and $TiO_2$—$ZrO_2$. Heteropolyacids, in particular $H_3PW_{12}O_{40}$ and $H_3PMo_{12}O_{40}$, can be used as catalysts on a support, but preferably in unsupported form.

U.S. Pat. No. 5,208,385 discloses catalysts based on amorphous mixed silicon-aluminum oxides. Mixed oxides based on $SnO_2/SiO_2$, $Ga_2O_3/SiO_2$, $Fe_2O_3/SiO_2$, $In_2O_3/SiO_2$, $Ta_2O_5/SiO_2$ and $HfO_2/SiO_2$ are also known. The abovementioned catalysts are preferably prepared by coprecipitation/sol-gel methods. Supported catalysts are disclosed in DE-A 44 33 606, in which tungsten oxides or molybdenum oxides are applied to, for example, $ZrO_2$, $TiO_2$, $HfO_2$, $Y_2O_3$, $Fe_2O_3$, $Al_2O_3$, $SnO_2$, $SiO_2$ or ZnO. Furthermore, $ZrO_2/SiO_2$ catalysts in which the support has an alkali metal concentration of <5000 ppm are recommended.

Catalysts based on acid ion exchangers are described in U.S. Pat. No. 4,120,903 for the polymerization of THF, in particular polymers comprising α-fluorosulfonic acid (for example Nafion®), in the presence of acetic anhydride. Catalysts comprising a metal and perfluoroalkylsulfonic acid anions are also suitable for the polymerization of THF.

In addition, further, if appropriate activated, clay minerals are also known as polymerization catalysts, as disclosed, for example, in WO 94/05719, WO 96/23833, WO 98/51729, WO 99/12992 and DE-A 195 134 93. Zeolites are also suitable as catalysts and are described, for example, in DE-A 43 16 138. Finally, sulfated zirconium oxides, sulfated aluminum oxides, supported heteropolyacids and supported ammonium bifluoride ($NH_4F$*HF) or antimony pentafluoride are also known as suitable polymerization catalysts. The process of the invention is preferably carried out using activated bleaching earths.

As a pretreatment for the catalysts, it is possible, for example, to dry it by means of gases, e.g. air or nitrogen, heated to from 80 to 200° C., preferably to from 100 to 180° C.

To avoid formation of ether peroxides, the polymerization is advantageously carried out under an inert gas atmosphere. As inert gases, it is possible to employ, for example, nitrogen, carbon dioxide or noble gases, with preference being given to using nitrogen.

The process can be carried out batchwise or continuously, but for economic reasons is preferably operated continuously.

Since telogens lead to chain termination, the mean molecular weight of the polymer to be prepared can be controlled via the amount of telogen used. Suitable telogens are $C_2$-$C_{12}$-carboxylic anhydrides and/or mixtures of protic acids with $C_2$-$C_{12}$-carboxylic anhydride. The protic acids are preferably organic or inorganic acids which are soluble in the reaction system. Examples are $C_2$-$C_{12}$-carboxylic acids such as acetic acid and sulfonic acids, sulfuric acid, hydrochloric acid, phosphoric acid. Preference is given to using acetic anhydride and/or acetic acid. In the first step, viz. the polymerization, monoesters and diesters of PTHF or of the THF copolymer are therefore formed.

The concentration of the acetic anhydride used as telogen in the feed fed into the polymerization reactor is from 0.03 to 30 mol %, preferably from 0.05 to 20 mol %, particularly preferably from 0.1 to 10 mol %, based on the THF used. If acetic acid is used in addition, the molar ratio in the feed to the ongoing polymerization is usually in the range from 1:20 to 1:20 000, based on acetic anhydride used.

The monoesters and diesters of THF copolymers can be prepared by the additional use of cyclic ethers which can be polymerized with ring opening as comonomers, preferably three-, four- and five-membered rings, for example 1,2-alkylene oxides, e.g. ethylene oxide or propylene oxide, oxetane, substituted oxetanes such as 3,3-dimethyloxetane, the THF derivatives 2-methyltetrahydrofuran or 3-methyltetrahydrofuran, with 2-methyltetrahydrofuran or 3-methyltetrahydrofuran being particularly preferred.

The use of $C_2$-$C_{12}$-diols as comonomers is likewise possible. These can be, for example, ethylene glycol, propylene glycol, butylene glycol, neopentyl glycol, 1,3-propanediol, 2-butyne-1,4-diol, 1,6-hexanediol or low molecular weight PTHF. Further suitable comonomers are cyclic ethers such as 1,2-alkylene oxides, for example ethylene oxide or propylene oxide, 2-methyltetrahydrofuran or 3-methyltetrahydrofuran.

In the fixed-bed mode of operation according to the invention, the polymerization reactor can be operated in the upflow mode, i.e. the reaction mixture is conveyed from the bottom upward, or in the downflow mode, i.e. the reaction mixture is passed from the top downward through the reactor. The feed comprising THF and telogen and/or comonomer is fed continuously into the polymerization reactor, with the space velocity over the catalyst being from 0.01 to 2.0 kg of THF/(1*h), preferably from 0.02 to 1.0 kg of THF/(1*h) and particularly preferably from 0.04 to 0.5 kg of THF/(1*h).

Furthermore, the polymerization reactor can be operated in a single pass, i.e. without product recirculation, or in the recycle mode, i.e. part of the polymerization mixture leaving the reactor is circulated. In the recycle mode, the ratio of recycle to feed is less than or equal to 150:1, preferably less than 100:1 and particularly preferably less than 60:1.

Monoesters and/or diesters of PTHF or of THF copolymers having mean molecular weights of from 250 to 10 000 dalton can be prepared in a targeted manner by means of the process as a function of the telogen content of the polymerization mixture. Preference is given to preparing the respective PTHF esters having mean molecular weights of from 500 to 5000 dalton, particularly preferably from 650 to 4000 dalton, by means of the process of the invention. In the present patent application, the term "mean molecular weight" or "mean molar mass" refers to the number average $M_n$ of the molecular weight of the polymers, which is determined, for example, by means of wet-chemical OH number determination in accordance with DIN 53 240.

The THF-containing output from the polymerization stage is filtered to retain traces of the polymerization catalyst and subsequently passed to remove THF by distillation. However, it is also possible for unreacted THF to be separated off first and the remaining monoesters or diesters of PTHF then to be freed of catalyst residues by filtration. The second method is preferred. As filtration apparatuses, industrially customary bed filters are used.

The ester groups in the polymers obtained in this way have to be converted in a second step. One customary method is reaction with lower alcohols initiated by alkaline catalysts. The transesterification using alkaline catalysts is known from the prior art and is described, for example, in DE-A 101 20 801 and DE-A 197 42 342. Preference is given to using methanol as lower alcohol and sodium methoxide as effective transesterification catalyst.

The polymers obtained can be used for reaction with organic isocyanates in a manner known per se to produce polyurethanes and polyurethane-ureas, in particular for preparing thermoplastic urethanes, Spandex, thermoplastic ether esters or copolyetheramides. The present invention therefore further provides for the use of the polytetrahydrofuran or the tetrahydrofuran copolymer prepared by the process of the invention for preparing polyurethane polymers or polyurethane-urea polymers as are required, for example, for the production of elastic fibers, including Spandex or Elasthan, thermoplastic polyurethanes (TPUs) or polyurethane casting elastomers.

Here, PTHF or a THF copolymer is firstly reacted in a manner known per se with an excess of an organic diisocyanate and then with an organic diamine, as described, for example, in JP-A 07-278 246.

The invention is illustrated below with the aid of examples.

EXAMPLES

Molecular Weight Determination

The mean molecular weight $M_n$ in the form of the number average of the molecular weight, defined as the mass of all PTHF molecules divided by their amount in mol, is determined by determining the hydroxyl number of polytetrahydrofuran. The hydroxyl number is the amount of potassium hydroxide in mg which is equivalent to the amount of acetic acid bound in the acetylation of 1 g of substance. The hydroxyl number is determined by the esterification of the hydroxyl groups present by means of an excess of acetic anhydride.

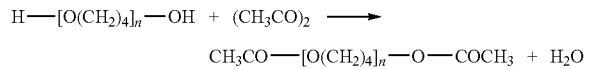

After the reaction, the excess acetic anhydride is hydrolyzed with water according to the following reaction equation

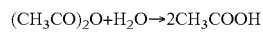

and backtitrated as acetic acid with sodium hydroxide.

Determination of the Evaporation Residue

The evaporation residue is the nonvolatile material in PTHF or PTHF ester/low boiler mixtures determined under prescribed conditions and serves as a measure of the yield. To determine the ER, a sample is evaporated at 145° C. for 30 minutes under atmospheric pressure and for 30 minutes at the same temperature and a reduced pressure of less than 1 mbar in an evaporation flask. The evaporation residue is calculated according to $$ER = \frac{m_2 \times 100}{m_1}$$

Here,
ER=evaporation residue, mass concentration in accordance with DIN 1310 in g/100 g
$m_1$=mass in g of the evaporation flask with the sample
$m_2$=mass in g of the evaporation flask with the evaporation residue
100=conversion factor from g to 100 g
Method To determine the evaporation residue, the previously weighed sample was treated on a rotary evaporator at 145° C. and atmospheric pressure for 1 hour and then at the same temperature at 0.1-0.2 mbar for 1 hour and weighed again. The evaporation residue was obtained as the percentage weight ratio to the initial value.

Determination of the Color Number

The polymers which had been freed of the solvent are measured untreated in a liquid color measurement apparatus LICO 200 from Dr. Lange. Precision cells No. 100-QS (path length: 50 mm, from Helma) are used.

Example 1

Extrudates having an average diameter of 1.5 mm were produced from bleaching earth (K10 powder from Süd-Chemie) and dried at 150° C. immediately before use. 200 ml (130 g) of the dried catalyst extrudates were introduced into each of two glass reaction tubes (inner total diameter: 3 cm, useful length: 30 cm) which were connected in series and were each provided with a thermostatable cooling jacket, so that a catalyst bed having a total useful length of 60 cm was obtained. The temperatures at the inlet of the first reaction tube, i.e. at the beginning of the catalyst bed, (P1) and at the outlet of the second reaction tube, i.e. at the end of the catalyst bed, (P2) were regulated by means of separate thermostats. The increase in temperature in the direction of flow through the catalyst bed was set to 2.46° C. per 60 cm of catalyst bed. The reactor was flooded with a polymerization mixture of THF and 3.5% of acetic anhydride at 35° C. at the inlet of the first reaction tube. The polymerization mixture was continuously circulated through the reaction apparatus by means of a pump, so that, at a constant recycle:feed ratio of 15:1, a further 30 g/h of the polymerization mixture were introduced into the reactor while the same amount of product mixture was taken from the circuit. For analysis of the product, the volatile components of the reaction product mixture, i.e. essentially unreacted THF and acetic anhydride, were evaporated under reduced pressure firstly at 70° C./30 mbar, then at 170° C./0.3 mbar and the polymer residue was analyzed. The result is summarized in table 1.

Comparative Example

In a manner analogous to example 1 according to the invention, the tube reactors connected in series were charged with catalyst. Unlike the example according to the invention, no temperature increase in the direction of flow through the catalyst bed was set. The reactor was flooded with a polymerization mixture of THF and 3.5% of acetic anhydride at 35° C. at the inlet of the first reaction tube. The polymerization mixture was continuously circulated through the reaction apparatus by means of a pump, so that, at a constant recycle:feed ratio of 15:1, a further 30 g/h of the polymerization mixture were introduced into the reactor while the same amount of product mixture was taken from the circuit. For analysis of the product, the volatile components of the reaction product mixture, i.e. essentially unreacted THF and acetic anhydride, were evaporated under reduced pressure firstly at 70° C./30 mbar, then at 170° C./0.3 mbar and the polymer residue was analyzed. The result is summarized in table 1.

TABLE 1

| | T1 [° C.] at P1 | T2 [° C.] at P2 | T [° C. m$^{-1}$] | Evaporation residue (ER) | Molecular weight [Mn] |
|---|---|---|---|---|---|
| Example 1 | 35 | 37.5 | 4.1 | 60.1% | 2115 |
| Comparative example 1 | 35 | 35 | 0 | 59.0% | 2093 |

The invention claimed is:

1. A process for preparing polytetrahydrofuran or tetrahydrofuran copolymers by polymerization of tetrahydrofuran in the presence of a telogen and/or a comonomer over a fixed bed of an acid catalyst, wherein the temperature increase of the polymerization mixture increases in the direction of flow through the catalyst bed and is at least 0.1° C. per meter of catalyst bed.

2. The process according to claim 1, wherein the temperature of the polymerization mixture at the beginning of the catalyst bed is from 0 to 50° C. and that at the end is from 30 to 80° C.

3. The process according to claim 1, wherein the temperature increase in the direction of flow through the catalyst bed is continual or in steps.

4. The process according to claim 1, wherein the catalyst bed is located in one or more reactors.

5. The process according to claim 1, wherein the temperature increase in the direction of flow through the catalyst bed is at least 0.2° C. per meter of catalyst bed.

6. The process according to claim 1, wherein the temperature increase in the direction of flow through the catalyst bed is at least 0.3° C. per meter of catalyst bed.

7. The process according to claim 1, wherein the catalyst is selected from among bleaching earths, mixed metal oxides of groups 3, 4, 13 and 14 of the Periodic Table of the Elements, supported tungsten oxides or molybdenum oxides, acid ion exchangers, zeolites and/or sulfated zirconium oxides.

8. The process according to claim 2, wherein the temperature increase in the direction of flow through the catalyst bed is continual or in steps.

9. The process according to claim 2, wherein the catalyst bed is located in one or more reactors.

10. The process according to claim 3, wherein the catalyst bed is located in one or more reactors.

11. The process according to claim 2, wherein the temperature increase in the direction of flow through the catalyst bed is at least 0.2° C. per meter of catalyst bed.

12. The process according to claim 3, wherein the temperature increase in the direction of flow through the catalyst bed is at least 0.2° C. per meter of catalyst bed.

13. The process according to claim 4, wherein the temperature increase in the direction of flow through the catalyst bed is at least 0.2° C. per meter of catalyst bed.

14. The process according to claim 2, wherein the temperature increase in the direction of flow through the catalyst bed is at least 0.3° C. per meter of catalyst bed.

15. The process according to claim 3, wherein the temperature increase in the direction of flow through the catalyst bed is at least 0.3° C. per meter of catalyst bed.

* * * * *